US009647780B2

(12) United States Patent
Jung et al.

(10) Patent No.: US 9,647,780 B2
(45) Date of Patent: *May 9, 2017

(54) INDIVIDUALIZING A CONTENT PRESENTATION

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 563 days.

This patent is subject to a terminal disclaimer.

(21) Appl. No.: 11/895,631

(22) Filed: Aug. 24, 2007

(65) Prior Publication Data

US 2009/0051542 A1     Feb. 26, 2009

(51) Int. Cl.
*G08B 23/00* (2006.01)
*H04H 60/33* (2008.01)
(Continued)

(52) U.S. Cl.
CPC ............. *H04H 60/33* (2013.01); *G06F 3/011* (2013.01); *G06F 3/0304* (2013.01); *G06Q 30/02* (2013.01);
(Continued)

(58) Field of Classification Search
CPC ....... G06F 3/011; G06F 3/0304; G06Q 30/02; H04H 60/33; H04H 60/45; H04H 60/65; H04L 67/36; H04N 5/74
(Continued)

(56) References Cited

U.S. PATENT DOCUMENTS 5,697,687 A * 12/1997 Coleman .............. H04N 9/3141
348/E5.143
6,437,758 B1   8/2002 Nielsen et al.
(Continued)

OTHER PUBLICATIONS

Cooper, Sean; "Google pushes targeted ads to cellular providers, handset makers"; engadget.com; bearing dates of Aug. 2, 2007 and 2003-2007; pp. 1-5; Weblogs, Inc.; located at http://www.engadget.com/2007/08/02/google-pushes-targeted-ads-to-cellular-providers-handset-makers; printed on Aug. 2, 2007.
(Continued)

*Primary Examiner* — Naomi Small

(57) ABSTRACT

Embodiments provide an apparatus, a system, and a method. A method individualizing a presentation of content includes receiving data indicative of a physical orientation of a person relative to a display operable to present the content. The method also includes selecting a display parameter of the presented content in response to the received data indicative of a physical orientation of a person. The method further includes employing the selected display parameter in presenting the content. The method may include generating the data indicative of a physical orientation of a person relative to a display operable to present the content. The method may include receiving information indicative of a change in the physical orientation of the person proximate to the display; and changing the display parameter of the presented content in response to the received information indicative of a change in the physical orientation of the person proximate to the display.

27 Claims, 16 Drawing Sheets

(51) Int. Cl.
*G06F 3/01* (2006.01)
*G06F 3/03* (2006.01)
*G06Q 30/02* (2012.01)
*H04H 60/65* (2008.01)
*H04L 29/08* (2006.01)
*H04N 5/74* (2006.01)

(52) U.S. Cl.
CPC .............. *H04H 60/65* (2013.01); *H04L 67/36* (2013.01); *H04N 5/74* (2013.01)

(58) Field of Classification Search
USPC ........................................................ 340/573.1
See application file for complete search history.

(56) References Cited

U.S. PATENT DOCUMENTS

| | | | |
|---|---|---|---|
| 7,158,097 B2 | 1/2007 | Taylor et al. | |
| 7,511,630 B2 * | 3/2009 | Strickland | G06F 3/041 340/815.4 |
| 7,519,703 B1 * | 4/2009 | Stuart | G06F 21/554 709/217 |
| 7,643,658 B2 * | 1/2010 | Kilner | G06K 9/00221 382/103 |
| 2002/0175924 A1 * | 11/2002 | Yui | G06F 3/14 345/660 |
| 2002/0184098 A1 * | 12/2002 | Giraud | G06Q 30/02 705/14.66 |
| 2003/0052911 A1 | 3/2003 | Cohen-solal | |
| 2003/0081834 A1 * | 5/2003 | Philomin | G06F 3/011 382/190 |
| 2003/0126013 A1 * | 7/2003 | Shand | G06Q 30/02 705/14.52 |
| 2003/0146901 A1 | 8/2003 | Ryan | |
| 2004/0075645 A1 * | 4/2004 | Taylor | G06F 3/013 345/157 |
| 2005/0195330 A1 | 9/2005 | Zacks et al. | |
| 2005/0229200 A1 | 10/2005 | Kirkland et al. | |
| 2006/0007358 A1 * | 1/2006 | Kim | H04N 5/44513 348/553 |
| 2006/0052136 A1 * | 3/2006 | Harris | H04M 1/05 455/557 |
| 2006/0093998 A1 | 5/2006 | Vertegaal | |
| 2006/0132432 A1 * | 6/2006 | Bell | G06F 3/011 345/156 |
| 2006/0197832 A1 * | 9/2006 | Yamada | G02B 27/017 348/77 |
| 2006/0256133 A1 * | 11/2006 | Rosenberg | G06Q 30/02 345/619 |
| 2007/0015559 A1 * | 1/2007 | Zalewski | G06F 3/017 463/1 |
| 2007/0124694 A1 * | 5/2007 | Van De Sluis | G06F 3/017 715/775 |
| 2007/0205962 A1 | 9/2007 | Thompson | |
| 2007/0271580 A1 | 11/2007 | Tischer et al. | |
| 2007/0283296 A1 * | 12/2007 | Nilsson | G06F 3/017 715/863 |
| 2008/0004951 A1 * | 1/2008 | Huang | G06Q 30/02 705/14.67 |
| 2008/0238889 A1 * | 10/2008 | Thorne | G02B 27/0093 345/204 |

OTHER PUBLICATIONS

Kim, Jaihie; "Intelligent Process Control Via Gaze Detection Technology"; DTIC (Defense Technical Information Center); bearing a date of Aug. 3, 1999; pp. 1-2; STINET; located at http://stinet.dtic.mil/oai/oai?&verb=getRecord&metadataPrefix=htm . . . ; printed on Aug. 6, 2007.

Manjoo, Farhad; "Your TV is watching you"; Salon.com; bearing dates of Aug. 1, 2007 and May 8, 2003; pp. 1-4, 1-4, 1-5, and 1-4 (17 pages total); Salon Media Group, Inc.; located at http://dir.salon.com/story/tech/feature/2003/05/08/future_tv/index.html; printed on Aug. 1, 2007.

Park, Kang Ryoung; Kim, Jaihie; "Real-Time Facial and Eye Gaze Tracking System"; Institute of Electronics, Information and Communication Engineers; bearing dates of Mar. 26, 2004 and Jul. 28, 2004; pp. 1-2; Oxford Journals, Oxford University Press; located at http://ietisy.oxfordjournals.org/cgi/content/abstract/E88-D/6/1231; printed on Aug. 6, 2007.

Zhu, Zhiwei; Ji, Qiang; "Eye and gaze tracking for interactive graphic display"; Machine Vision and Applications; bearing a date of Jul. 2004; pp. 139-148; vol. 15, No. 3; Springer Berlin/Heidelberg; Abstract provided, pp. 1-2 and located at http://www.springerlink.com/content/3rxt9clyx87mr0mm/.

* cited by examiner

Receiving data indicative of a physical orientation of a person relative to a display operable to present the content.

426 Receiving data indicative of a physical orientation of a person relative to a display space usable to present the content.

428 Receiving data indicative of a physical orientation of a person relative to a display that is presenting the content.

432 Receiving data indicative of a physical orientation of a person relative to a display operable to at least one of displaying, exhibiting, and/or showing content.

434 Receiving data indicative of a physical orientation of a person relative to a display operable to present at least one of a streaming and/or static content.

436 Receiving data indicative of a physical orientation of a person relative to a display operable to present at least one of a visual, holographic, audible, and/or airborne-particle content.

438 Receiving data indicative of a physical orientation of a person relative to a display having a visual screen area greater than three square feet and operable to present the content.

Selecting a display parameter of the presented content in response to the received data indicative of a physical orientation of a person.

452 Selecting an adjustment of a display parameter of the presented content in response to the received data indicative of a physical orientation of a person.

454 Selecting a physical display parameter of the presented content in response to the received data indicative of a physical orientation of a person.

456 Selecting a portion of a display screen real estate to present the content in response to the received data indicative of a physical orientation of a person.

458 Selecting a location of display screen real estate to present the content within the display in response to the received data indicative of a physical orientation of a person.

459 Selecting a parameter intensity of the presented content in response to the received data indicative of a physical orientation of a person.

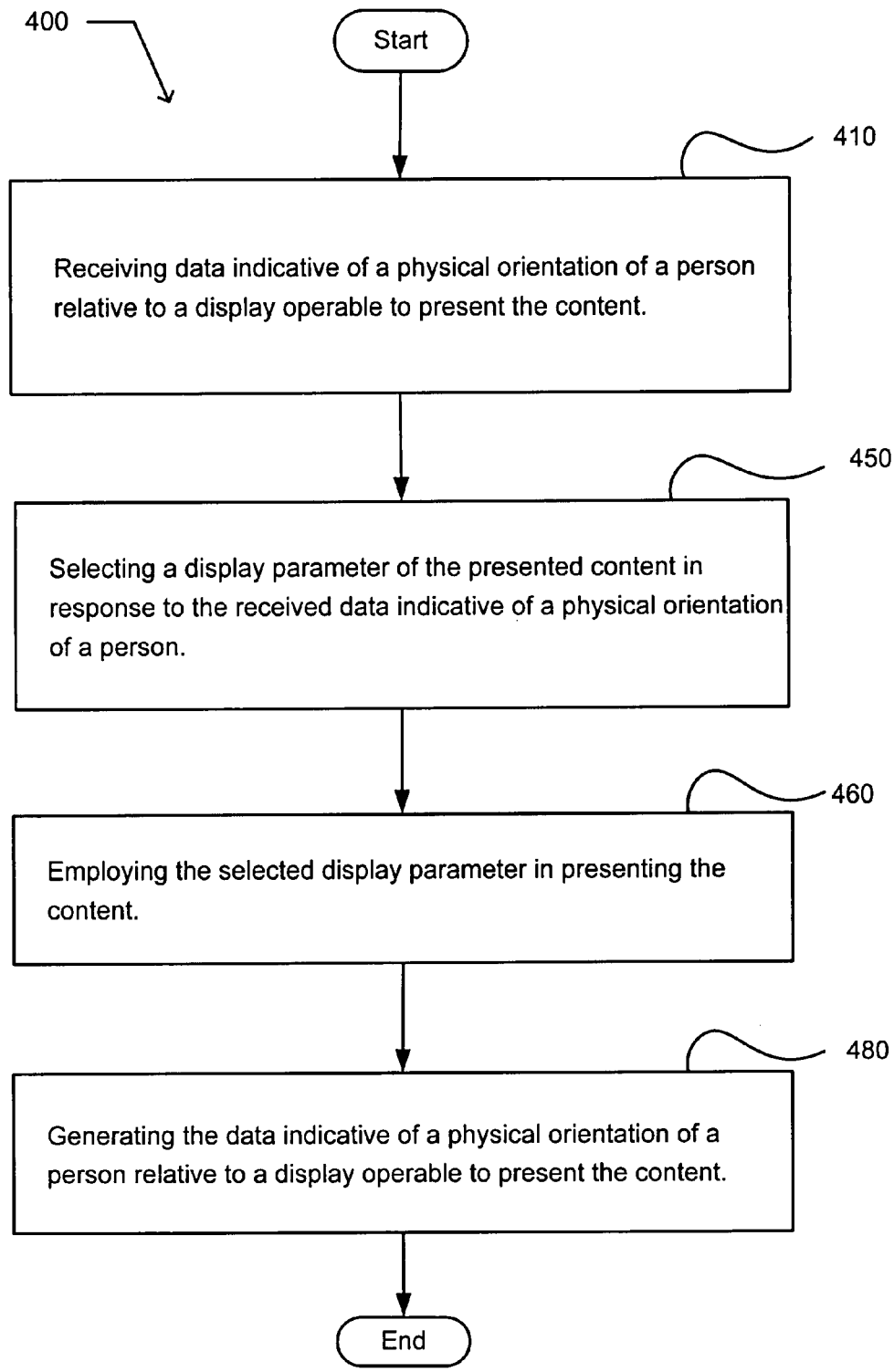

FIG. 11

480 — Generating the data indicative of a physical orientation of a person relative to a display operable to present the content.

482 Generating data indicative of a dynamic physical orientation of a person relative to a display operable to present the content.

484 Generating data indicative of a static physical orientation of a person relative to a display operable to present the content.

486 Generating data indicative of a physical orientation of a person proximate to a display operable to present the content.

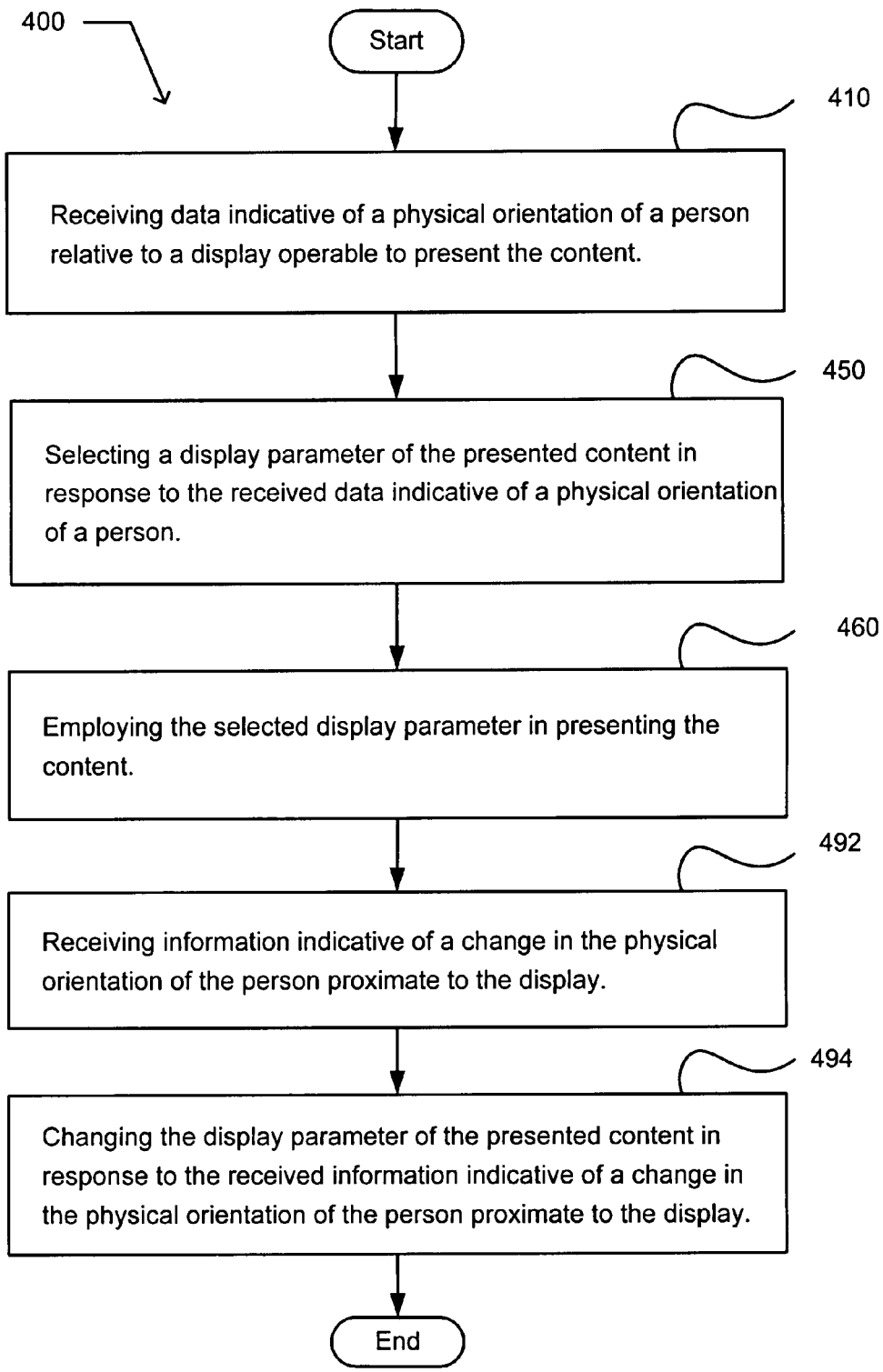

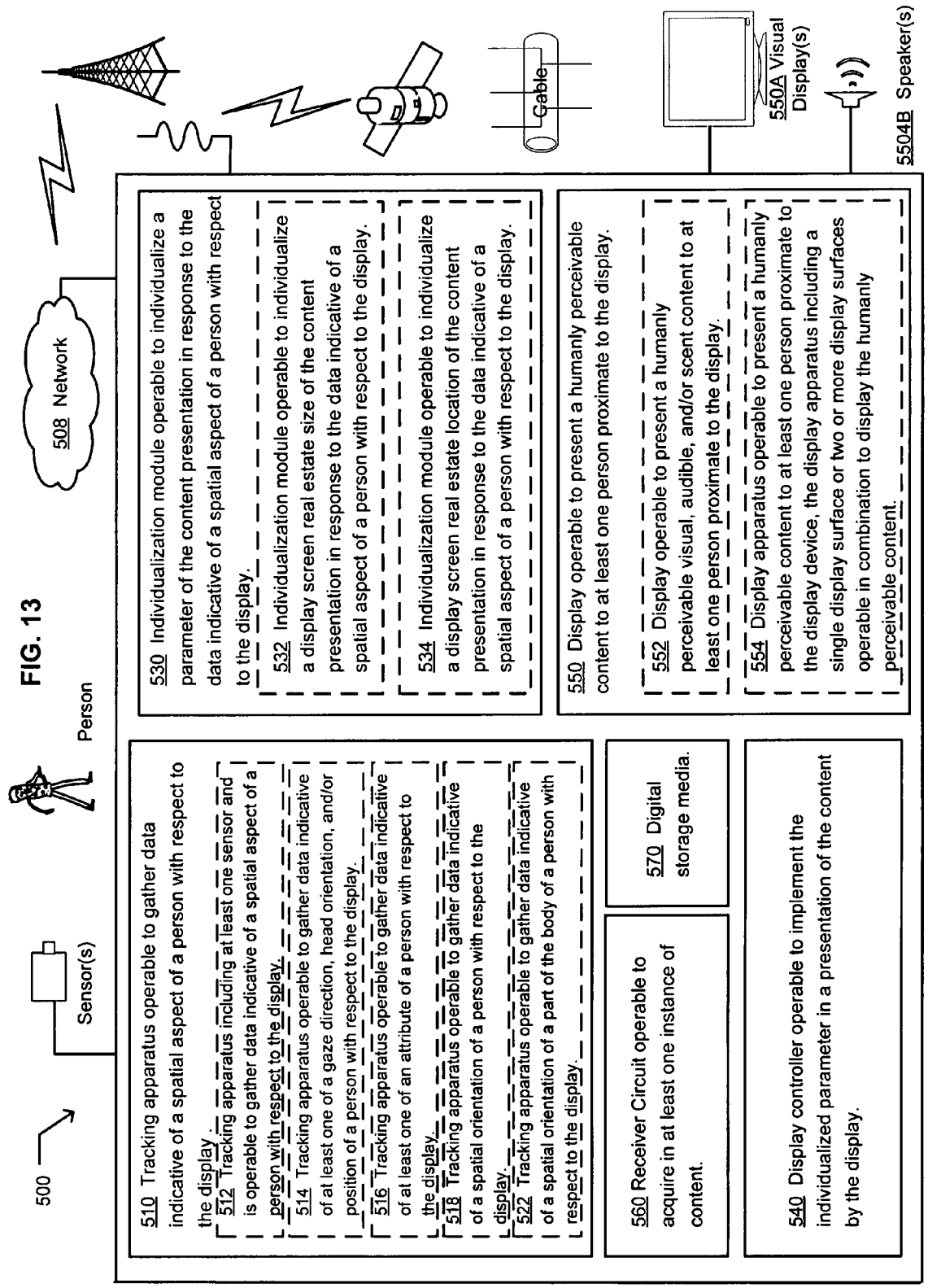

INDIVIDUALIZING A CONTENT PRESENTATION

SUMMARY

An embodiment provides method individualizing a presentation of content. The method includes receiving data indicative of a physical orientation of a person relative to a display operable to present the content. The method also includes selecting a display parameter of the presented content in response to the received data indicative of a physical orientation of a person. The method further includes employing the selected display parameter in presenting the content. The method may include generating the data indicative of a physical orientation of a person relative to a display operable to present the content. The method may include receiving information indicative of a change in the physical orientation of the person proximate to the display; and changing the display parameter of the presented content in response to the received information indicative of a change in the physical orientation of the person proximate to the display. In addition to the foregoing, other method embodiments are described in the claims, drawings, and text that form a part of the present application.

Another embodiment provides a system for individualizing a content presentation by a display. The system includes a tracking apparatus operable to gather data indicative of a spatial aspect of a person with respect to the display. The system also includes an individualization module operable to individualize a parameter of the content presentation in response to the data indicative of a spatial aspect of a person with respect to the display. The system further includes a display controller operable to implement the individualized parameter in a presentation of the content by the display. The system may include the display operable to present a humanly perceivable content to at least one person proximate to the display. In addition to the foregoing, other system embodiments are described in the claims, drawings, and text that form a part of the present application.

A further embodiment includes an apparatus for individualizing presentation of a content. The apparatus includes means for receiving data indicative of a physical orientation of a person relative to a display operable to present the content. The apparatus further includes means for selecting a display parameter of the presented content in response to the received data indicative of a physical orientation of a person. The apparatus also includes means for employing the selected display parameter in presenting the content. The apparatus may include means for generating the data indicative of a physical orientation of a person relative to a display operable to present the content. The apparatus may include means for receiving information indicative of a change in the physical orientation of the person proximate to the display; and means for changing the display parameter of the presented content in response to the received information indicative of a change in the physical orientation of the person proximate to the display. In addition to the foregoing, other apparatus embodiments are described in the claims, drawings, and text that form a part of the present application.

An embodiment provides a method respectively individualizing content presentation for at least two persons. The method includes receiving a first data indicative of a spatial orientation of a first person of the at least two persons relative to a display presenting a first content. The method also includes selecting a first display parameter of the first presented content in response to the received first data indicative of a spatial orientation of the first person. The method further includes employing the selected first display parameter in presenting the first content. The method also includes receiving a second data indicative of a spatial orientation of a second person of the at least two persons relative to the display presenting a second content. The method further includes selecting a second display parameter of the second presented content in response to the second received data indicative of a spatial orientation of the second person. The method also includes employing the selected second display parameter in presenting the second content. In addition to the foregoing, other method embodiments are described in the claims, drawings, and text that form a part of the present application.

Another embodiment provides a method of individualizing a presentation of a content. The method includes receiving data indicative of an attribute of a person proximate to a display operable to present the content. The method also includes selecting the content in response to the received data indicative of an attribute of the person. The method further includes presenting the selected content using the display. In addition to the foregoing, other method embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 illustrates another alternative embodiment of the operational flow described in conjunction with FIG. 5;

FIG. 9 illustrates an alternative embodiment of the operational flow described in conjunction with FIG. 5;

FIG. 10 illustrates a further alternative embodiment of the operational flow described in conjunction with FIG. 5;

FIG. 11 illustrates an alternative embodiment of the operational flow described in conjunction with FIG. 5;

FIG. 12 illustrates another alternative embodiment of the operational flow described in conjunction with FIG. 5;

FIG. 13 illustrates an example system for individualizing a content presentation by a display;

DETAILED DESCRIPTION

Figure 1:
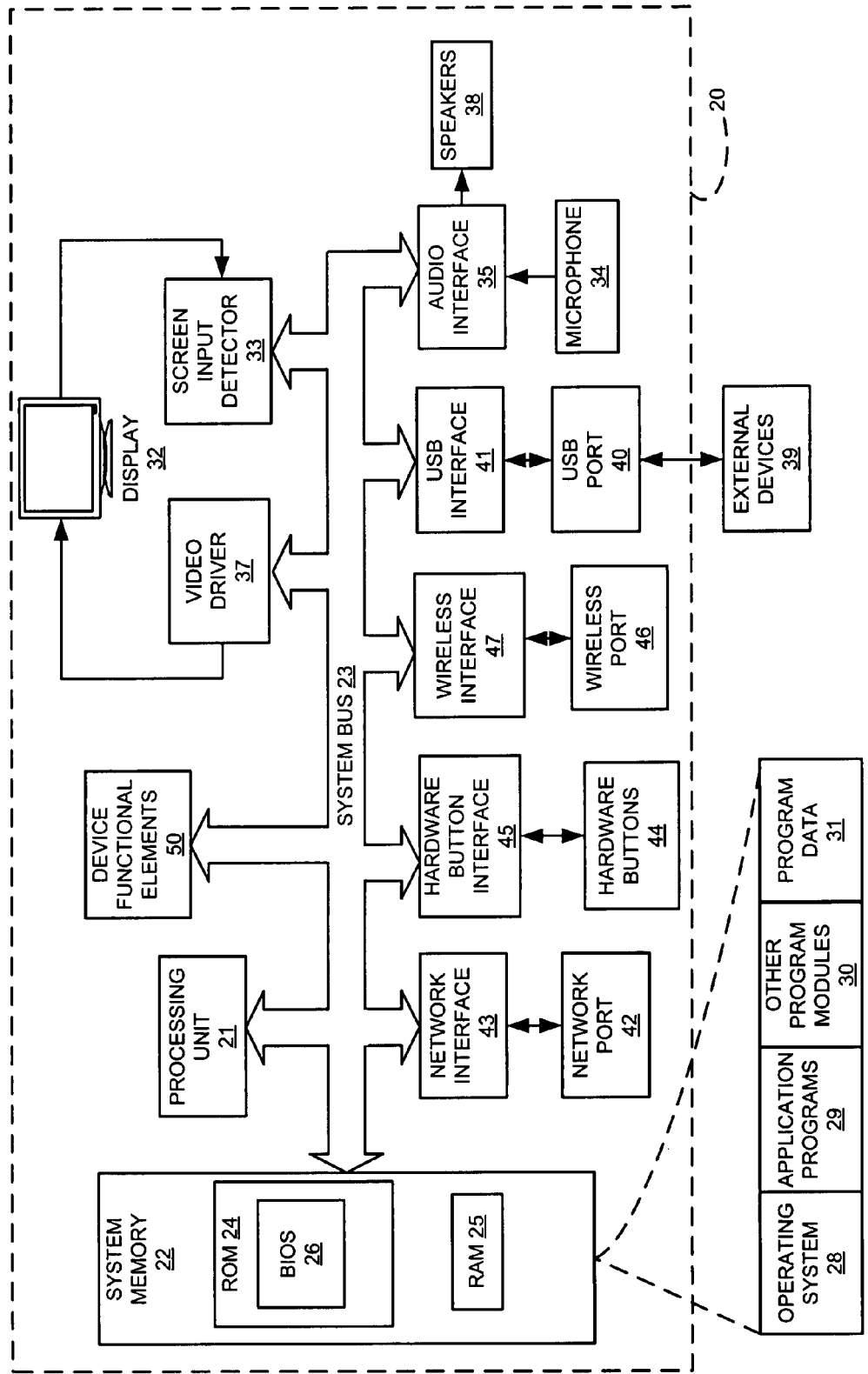
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
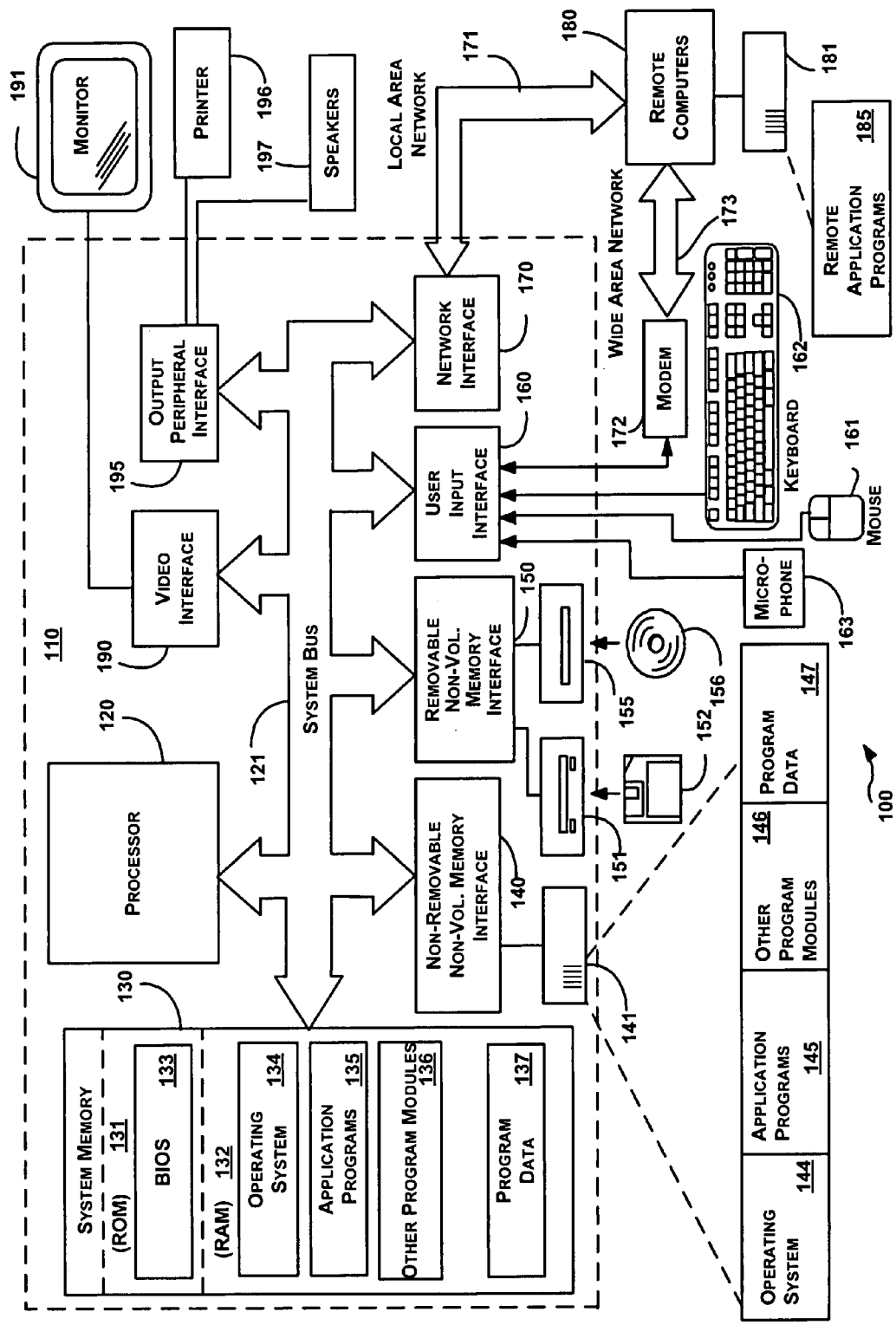
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
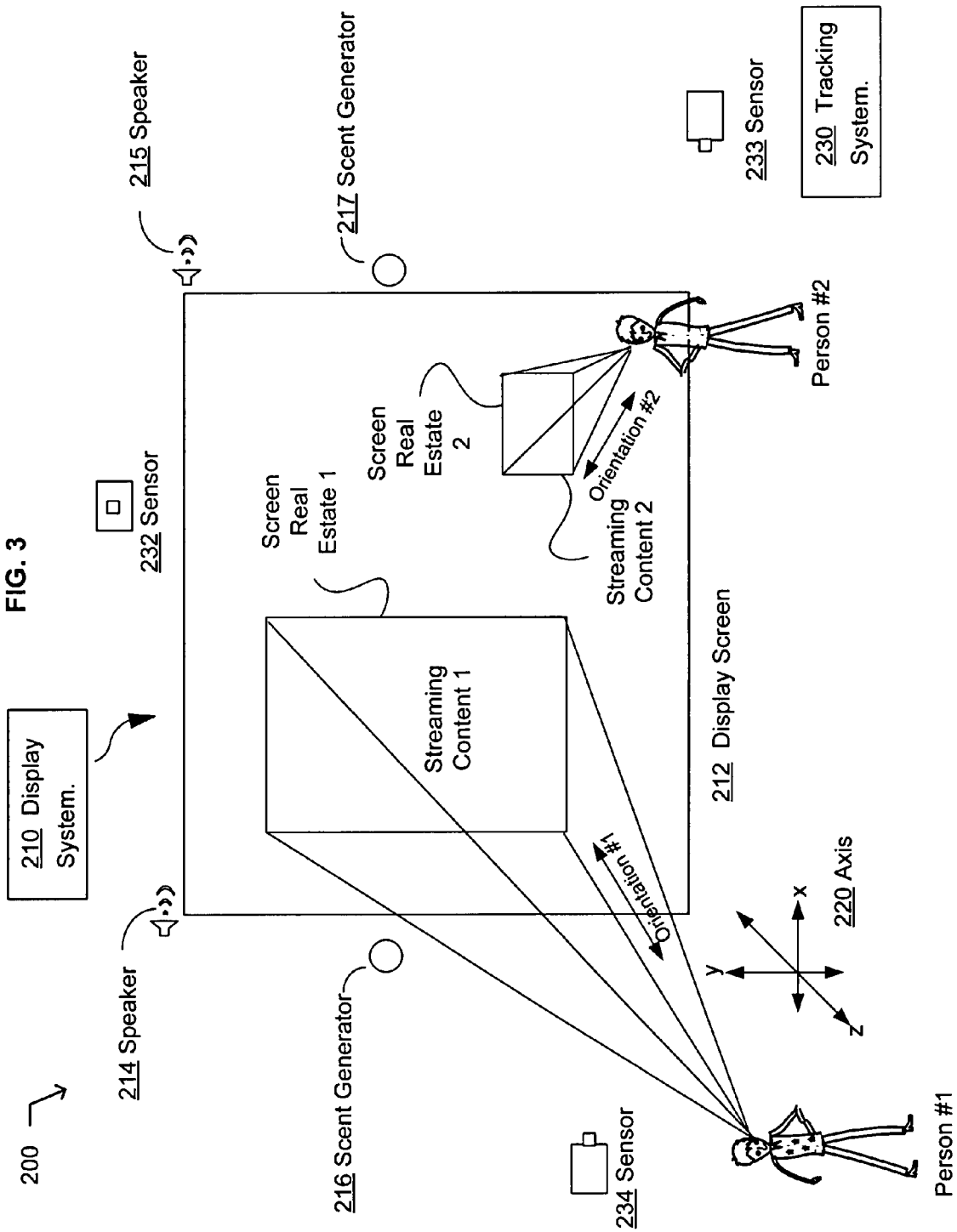
FIG. 3 illustrates an exemplary system in which embodiments may be implemented.

FIG. 3 illustrates another environment 200 in which embodiments may be implemented. The environment includes a display 210 system, and a tracking system 230. The display system may include a display screen 212. The display system may include one or more speakers, illustrated as speaker 214, and/or speaker 215. The display system may include one or more scent generators, illustrated as scent generator 216, and/or scent generator 217. In addition, the display system may include an additional display, such as a holographic display (not shown).

The tracking system 230 may include one or more sensors operable to acquire data indicative of an orientation of a person, such as person #1, with respect to a display, such as the display screen 212. For example, the one or more sensors may include image sensors, illustrated as image sensor 232, image sensor 233, and/or image sensor 234. The image sensors may include a visual image sensor, a visual camera, and/or an infrared sensor. By way of further example, the one or more sensors may include a radar, and/or other type of distance and bearing measuring sensor. The data indicative of a relationship between a person and a display may include orientation information. Orientation information may include a coordinate relationship expressed with respect to an axis, such as the axis 220. Alternatively, orientation information may include bearing and distance. The data indicative of a relationship between a person and a display may include data indicative of a gaze direction of a person, such as for example, a direction and a distance of person #2's gaze.

The display screen 212 may be described as including at least two areas of screen real estate, the two areas of screen real estate being useable for displaying respective multiple instances of content. The content may include a static content, a dynamic content, and/or a streaming content. For example, a portion of the display screen proximate to person #1, indicated as screen real estate 1, may be used to provide a streaming content 1 to person #1. In another example, another portion of the display screen proximate to person #2, indicated as screen real estate 2, may be used to provide a streaming content 2 to person #2. Streaming content 2 may or may not be substantially similar to streaming content 1.

Figure 4:
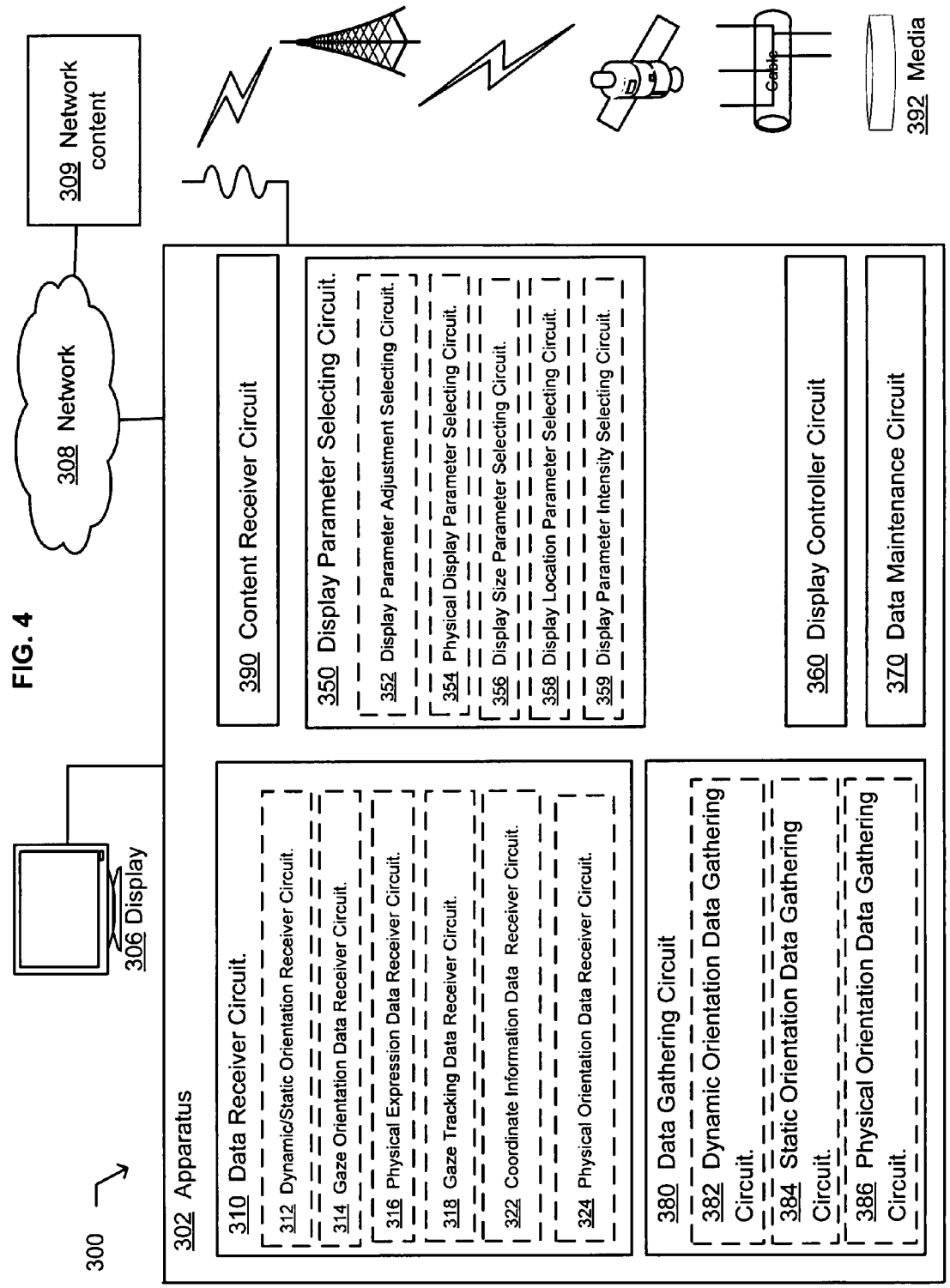
FIG. 4 illustrates an example system in which embodiments may be implemented.

FIG. 4 illustrates an example system 300 in which embodiments may be implemented. The example system includes an apparatus 302, a display 306, and access to streaming content via a wireless link, a satellite link, and/or a wired link network 308. In an embodiment, the apparatus includes a data receiver 310, a display parameter selecting circuit 350, and a display controller circuit 360. In some embodiments, one or more of the data receiver circuit, the display parameter selecting circuit, and the display controller circuit may be structurally distinct from the remaining circuits. In an embodiment, the apparatus or a portion of the apparatus may be implemented in whole or in part using the thin computing device 20 described in conjunction with FIG. 1, and/or the computing device 110 described in conjunction with FIG. 2. In another embodiment, the apparatus or a portion of the apparatus may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. In an alternative embodiment, the apparatus may include a data maintenance circuit 370, a data gathering circuit 380, and/or a content receiver circuit 390. The content receiver circuit may include a fixed, and/or a removable computer storage media 392.

In an embodiment, the data receiver circuit 310 may include at least one additional circuit. The at least one additional circuit may include a dynamic/static orientation receiver circuit 312; a gaze orientation data receiver circuit 314; a physical expression data receiver circuit 316; a gaze tracking data receiver circuit 318; a coordinate information data receiver circuit 322; and/or a physical orientation data receiver circuit 324.

In another embodiment, the display parameter selecting circuit 350 may include at least one additional circuit. The at least one additional circuit may include a display parameter adjustment selecting circuit 352; a physical display parameter selecting circuit 354; a display size parameter selecting circuit 356; a display location parameter selecting circuit 358; and/or a display parameter intensity selecting circuit 359.

In a further embodiment, the data gathering circuit may 380 include at least one additional circuit. The at least one additional circuit may include a dynamic orientation data gathering circuit 382; a static orientation data gathering circuit 384; and a physical orientation data gathering circuit.

Figure 5:
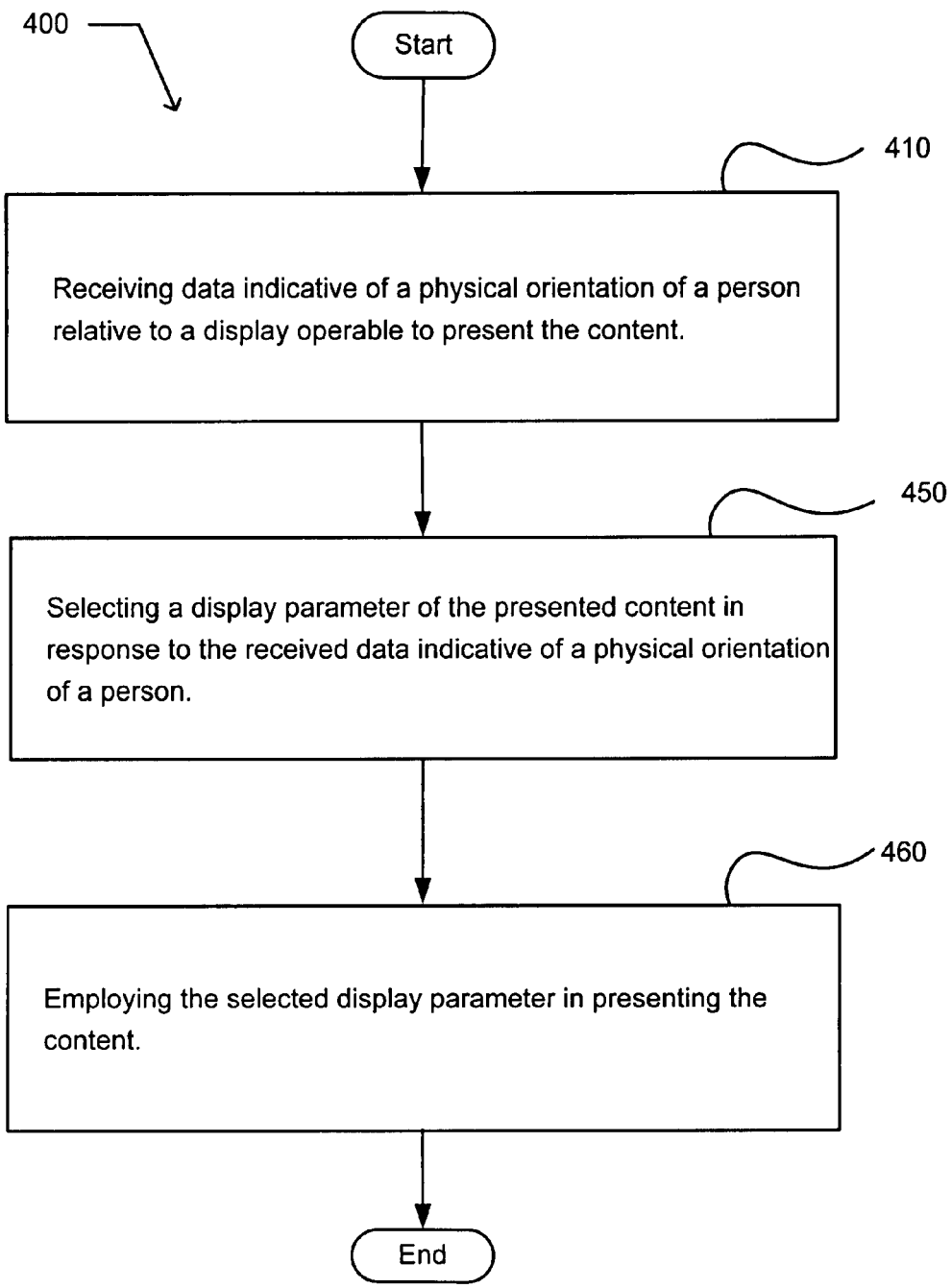
FIG. 5 illustrates an example of an operational flow for individualizing a presentation of a content.

FIG. 5 illustrates an example of an operational flow 400 for individualizing a presentation of a content. FIG. 5 and several following figures may include various examples of operational flows, discussions, and explanations with respect to the above-described system 300 of FIG. 4, and/or with respect to other examples and contexts. However, it should be understood that the operational flows may be executed in a number of other environment and contexts, and/or in modified versions of FIG. 4. Also, although the various operational flows are illustrated in a sequence(s), it should be understood that the various operations may be performed in other orders than those which are illustrated, and/or may be performed concurrently.

After a start operation, the operational flow 400 includes an acquiring operation 410 that receives data indicative of a physical orientation of a person relative to a display operable to present the content. The acquiring operation may be implemented using the data receiver circuit 310 described in conjunction with FIG. 4. A choosing operation 450 selects a display parameter of the presented content in response to the received data indicative of a physical orientation of a person. The choosing operation may be implemented using the display parameter selecting circuit 350. A utilization operation 460 employs the selected display parameter in presenting the content. The utilization operation may be implemented using the display content controller 360. The operational flow then moves to an end operation.

In embodiment, the operational flow 400 may be implemented in the environment 200 described in conjunction with FIG. 3. The acquiring operation 410 may receive data indicative of a physical orientation #1 of a the person #1 relative to the display screen 212 operable to present the streaming content 1. For example, the physical orientation #1 of the person #1 relative to the display screen may include the person's gaze direction. The data indicative of person #1's physical orientation may be gathered using the tracking system 230, and its associated sensors 232, 233, and 234 that are appropriately located in the environment 200. For example, the choosing operation 450 may select a display parameter that includes the screen real estate 1 portion of the display screen advantageously located relative to the physical orientation #1 of the person #1 for person #1 to view the streaming content #1. The selected portion of the display screen is indicated as screen real estate 1. In another example, the display parameter may include selecting a scent to be presented from the scent generator 216, and/or scent the generator 217. The display system 210 may employ the display parameter selected by the utilization operation 460 by presenting the streaming content 1 at the screen real estate 1 portion of the display screen 212. In another embodiment, the person #1 may move from the left to the right of the display screen and into the orientation #2, and become for illustration purposes the person #2. The operational flow 400 may then be repeated to select and utilize the screen real estate 2 to present advantageously the streaming content 1, or to select and utilize the screen real estate 2 to present advantageously the streaming content 2.

In an embodiment, the content may include a static content, a dynamic content, and/or a streaming content. Streaming content may include television-based content, such as scripted program, an unscripted program, a sports event, and/or a movie. In a further embodiment, the streaming content may include prerecorded program content. For example, the prerecorded program content may include advertising and/or promotional material. In another embodiment, the content may include a similar content provided over a network, such as the Internet. In a further embodiment, the streaming content may include a streaming content from the Internet, such as streaming content from YouTube.com, and/or MSNBC. In another embodiment, the streaming content may be received from a terrestrial or an extraterrestrial transmitter. The content may include a streaming content received by the apparatus 200 of FIG. 3 via a wireless link, a satellite link, and/or a wired link network 208. The content may include content retrieved from a computer storage media, such as the computer storage media 392.

Figure 6:
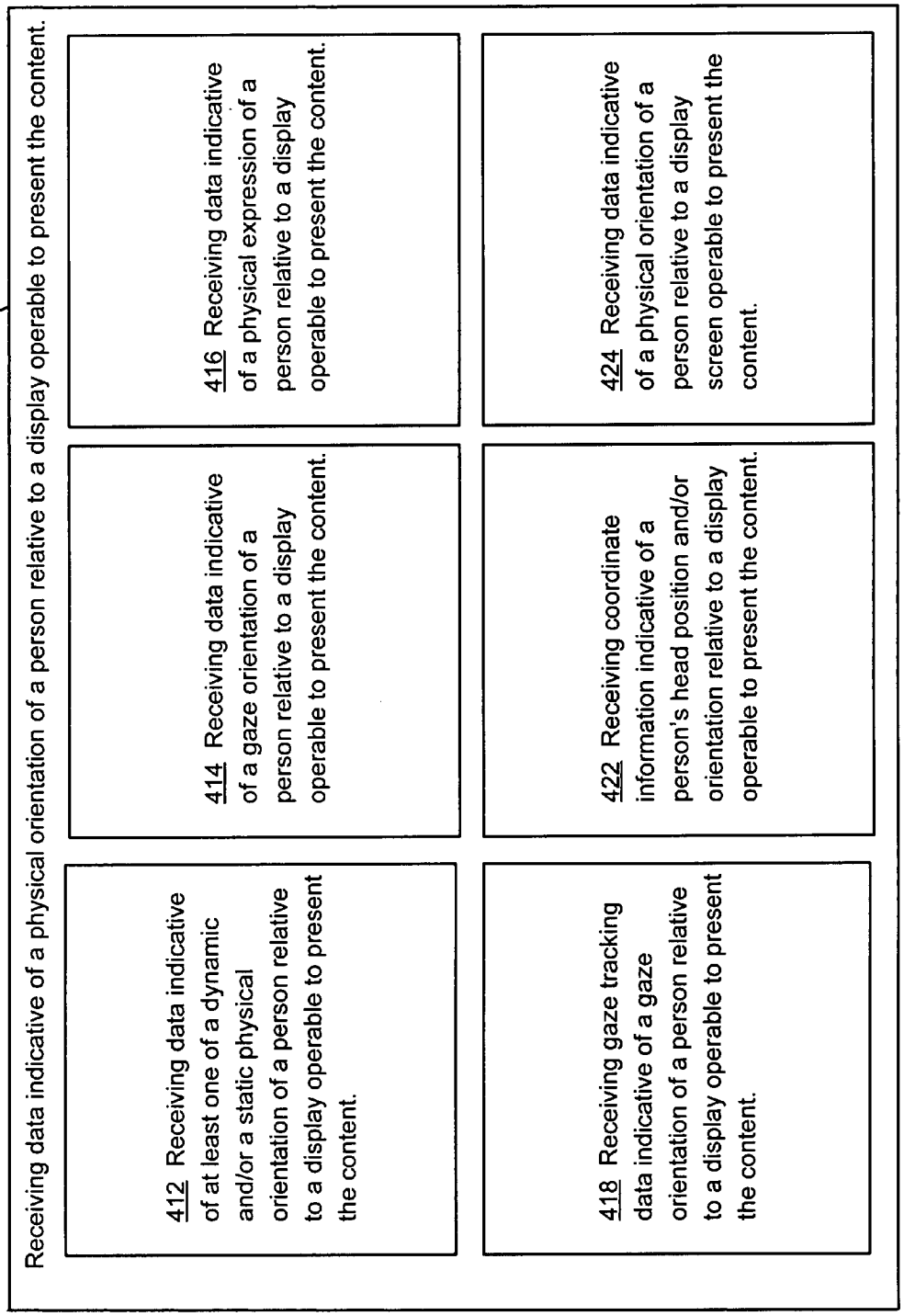
FIG. 6 illustrates an alternative embodiment of the operational flow described in conjunction with FIG. 5.

FIG. 6 illustrates an alternative embodiment of the operational flow 400 described in conjunction with FIG. 5. The acquiring operation 410 may include at least one additional operation. The at least one additional operation may include an operation 412, an operation 414, an operation 416, an operation 418, an operation 422, and/or an operation 424. The operation 412 receives data indicative of at least one of a dynamic and/or a static physical orientation of a person relative to a display operable to present the content. The operation 412 may be implemented using the dynamic/static orientation receiver circuit 312 of FIG. 4. The operation 414 receives receiving data indicative of a gaze orientation of a person relative to a display operable to present the content. In an embodiment, the data indicative of a gaze may include data indicative of a gaze direction, such as the gaze direction of person #1 of FIG. 3. In another embodiment, the data indicative of a gaze may include data indicative of a gaze blinking, and/or a gaze-based expression. The operation 414 may be implemented using the gaze orientation data receiver circuit 314. The operation 416 receives data indicative of a physical expression of a person relative to a display operable to present the content. For example, the physical expression may include an instance of body language, a smile, and/or a frown. The operation 416 may be implemented using the physical expression data receiver circuit 316. The operation 418 receives gaze tracking data indicative of a gaze orientation of a person relative to a display operable to present the content. The operation 418 may be implemented using the gaze tracking data receiver circuit 318. The operation 422 receives coordinate information indicative of a person's head position and/or orientation relative to a display operable to present the content. For example, in an embodiment, the coordinate information may include three-axis coordinate information indicative the person's head or eye position relative to the display, such as x-y-z axis information, or bearing and distance information. In another embodiment, the coordinate information may include spherical coordinates. In a further embodiment, the coordinate information may include proximity, distance, angle, and/or head height above a plane, walking surface, and/or floor. The operation 422 may be implemented using the coordinate information data receiving circuit 322. The operation 424 receives data indicative of a physical orientation of a person relative to a display screen operable to present the content. The operation 424 may be implemented using the physical orientation data receiver circuit 324.

FIG. 7 illustrates another alternative embodiment of the operational flow 400 described in conjunction with FIG. 5. The acquiring operation 410 may include at least one additional operation. The at least one additional operation may include an operation 426, an operation 428, an operation 432, an operation 434, an operation 436, and/or an operation 438. The operation 426 receives data indicative of a physical orientation of a person relative to a display space usable to present the content. The operation 428 receives data indicative of a physical orientation of a person relative to a display that is presenting the content. The operation 432 receives data indicative of a physical orientation of a person relative to a display operable to at least one of displaying, exhibiting, and/or showing content. The operation 434 receives data indicative of a physical orientation of a person relative to a display operable to present at least one of a streaming and/or static content. The operation 436 receives data indicative of a physical orientation of a person relative to a display operable to present at least one of a visual, holographic, audible, and/or airborne-particle content. The operation 438 receives data indicative of a physical orientation of a person relative to a display having a visual screen area greater than three square feet and operable to present the content. The operations 426, 428, 432, 434, 436, and/or 438 may be implemented using the physical orientation data receiver circuit 324 of FIG. 4.

Figure 8:
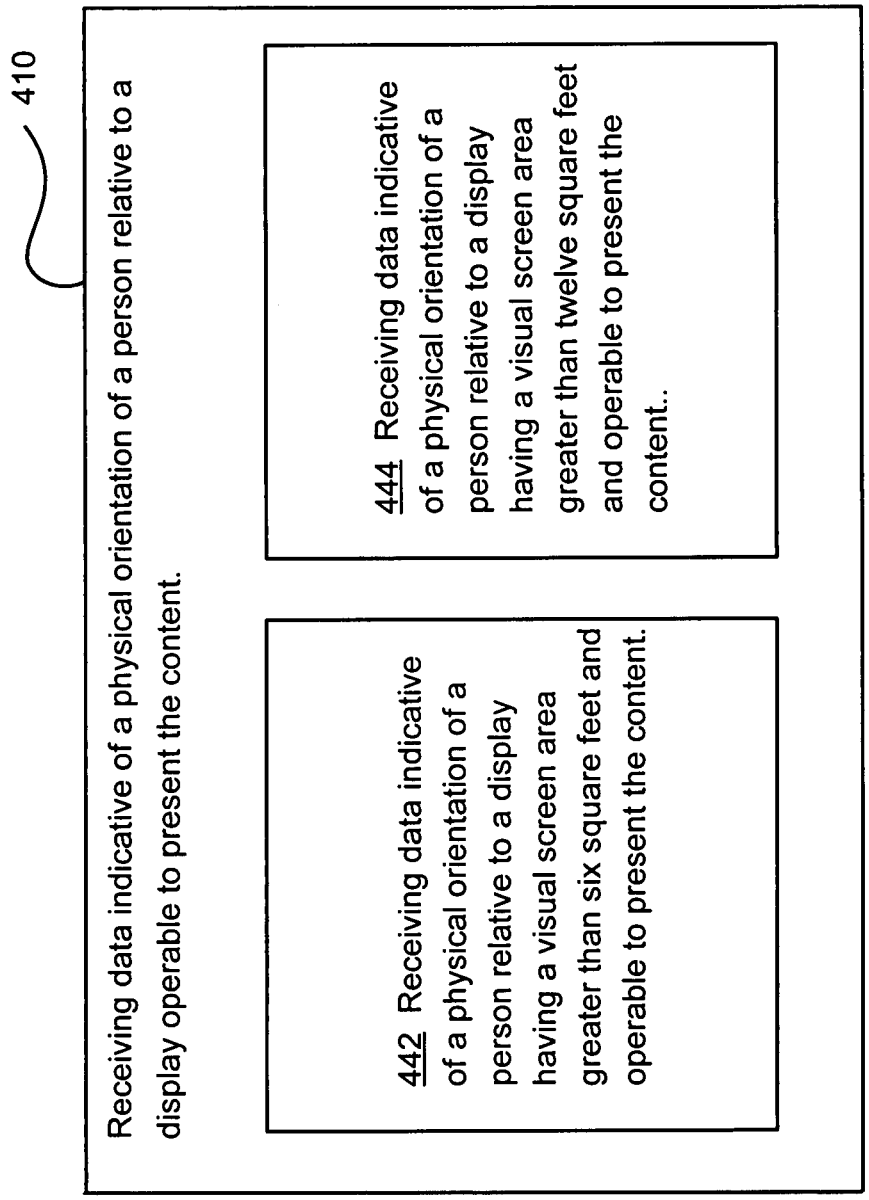
FIG. 8 illustrates an alternative embodiment of the operational flow described in conjunction with FIG. 5.

FIG. 8 illustrates an alternative embodiment of the operational flow 400 described in conjunction with FIG. 5. The acquiring operation 410 may include at least one additional operation. The at least one additional operation may include an operation 442, and/or an operation 444. The operation 442 receives data indicative of a physical orientation of a person relative to a display having a visual screen area greater than six square feet and operable to present the content. For example, the display screen 212 of FIG. 3 may include a display screen having a visual screen area greater than six square feet. Further as illustrated in FIG. 3, the visual screen area of the display screen may be allocated into separate display areas, illustrated as the screen real estate 1 and the screen real estate 2. The operation 444 receives data indicative of a physical orientation of a person relative to a display having a visual screen area greater than twelve square feet and operable to present the content. The operations 442, and/or 444 may be implemented using the physical orientation data receiver circuit 326 of FIG. 4.

FIG. 9 illustrates an alternative embodiment of the operational flow 400 described in conjunction with FIG. 5. The choosing operation 450 may include at least one additional operation. The at least one additional operation may include an operation 452, an operation 454, an operation 456, an operation 458, and/or an operation 459. The operation 452 selects an adjustment of a display parameter of the presented content in response to the received data indicative of a physical orientation of a person. The operation 452 may be implemented using the display parameter adjustment selecting circuit 352 of FIG. 4. The operation 454 selects a physical display parameter of the presented content in response to the received data indicative of a physical orientation of a person. The operation 454 may be implemented using the physical display parameter adjustment selecting circuit 354. The operation 456 selects a portion of a display screen real estate to present the content in response to the received data indicative of a physical orientation of a person. For example, the portion of the display screen, i.e., screen real estate occupied by the presented content, may be selected as 100%, 65%, 30%, or 15% of screen real estate depending on the distance of the person from a display screen. For example, if the person #1 of FIG. 3 were 10 feet away from the display screen 212, the operation may select 65% of the screen real estate to present the content. By way of further example, if the person #2 was three feet away from the display screen, the operation may select 15% of the screen to present the content. The operation 456 may be implemented using the display size selecting circuit 356. The operation 458 selects a location of display screen real estate to present the content within the display in response to the received data indicative of a physical orientation of a person. For example, a selected location may include a right portion, a left portion, top portion, bottom portion, or a middle portion of the display screen. The operation 458 may be implemented using the display location selecting circuit 358. The operation 459 selects a parameter intensity of the presented content in response to the received data indicative of a physical orientation of a person. For example, a selected parameter intensity may include at least one of a selected sound volume (i.e., loud, conversational level, whisper level, of the presented content), a scent level of the presented content, and/or a visual effect of the presented content. The operation 459 may be implemented using the display parameter intensity selecting circuit 359.

FIG. 10 illustrates a further alternative embodiment of the operational flow 400 described in conjunction with FIG. 5. The operational flow may include a data gathering operation 480. The data gathering operation generates the data indicative of a physical orientation of a person relative to a display operable to present the content. The data gathering operation may be implemented by the data gathering circuit 380.

FIG. 11 illustrates an alternative embodiment of the operational flow 400 described in conjunction with FIG. 5. The data gathering operation 480 may include at least one additional operation. The at least one additional operation may include an operation 482, an operation 484, and/or an operation 486. The operation 482 generates data indicative of a dynamic physical orientation of a person relative to a display operable to present the content. The operation 482 may be implemented by the dynamic orientation data gathering circuit 382. The operation 484 generates data indicative of a static physical orientation of a person relative to a display operable to present the content. The operation 484 may be implemented by the static orientation data gathering circuit 384. The operation 486 generates data indicative of a physical orientation of a person proximate to a display operable to present the content. The operation 486 may be implemented by the physical orientation data gathering circuit 386.

FIG. 12 illustrates another alternative embodiment of the operational flow 400 described in conjunction with FIG. 5. The operational flow may include an operation 492 and an operation 494. The operation 492 receives information indicative of a change in the physical orientation of the person proximate to the display. The operation 494 changes the display parameter of the presented content in response to the received information indicative of a change in the physical orientation of the person proximate to the display. In an alternative embodiment, the operation 494 changes another display parameter of the presented content in response to the received information indicative of a change in the physical orientation of the person proximate to the display.

FIG. 13 illustrates an example system 500 for individualizing a content presentation by a display 550. The system includes a tracking apparatus 510, an individualization module 530, and a display controller 540. The tracking apparatus includes a tracking apparatus operable to gather data indicative of a spatial aspect of a person with respect to the display. In an embodiment, the data indicative of a spatial aspect of a person includes data indicative of a spatial aspect of a body part, and/or member of a person. For example, a body part may include an eye or a hand. In another embodiment, the display may include a display apparatus, a display screen, and/or a display space.

The individualization module 530 includes an individualization module operable to individualize a parameter of the content presentation in response to the data indicative of a spatial aspect of a person with respect to the display 550. The display controller 540 includes a display controller operable to implement the individualized parameter in a presentation of the content by the display.

In an alternative embodiment, the tracking apparatus 510 may include at least one additional embodiment. The at least one additional embodiment may include tracking apparatus 512, tracking apparatus 514, tracking apparatus 516, tracking apparatus 518, and/or tracking apparatus 522. The tracking apparatus 512 includes at least one sensor and is operable to gather data indicative of a spatial aspect of a person with respect to the display 550. In an embodiment, the at least one sensor includes a camera, microphone, and/or an identification signal receiver. The tracking apparatus 514 includes a tracking apparatus operable to gather data indicative of at least one of a gaze direction, head orientation, and/or position of a person with respect to the display. The tracking apparatus 516 includes a tracking apparatus operable to gather data indicative of at least one of an attribute of a person with respect to the display. For example, an attribute of the person may include a male attribute, a female attribute, and/or an age attribute, such as young or old. The tracking apparatus 518 includes a tracking apparatus operable to gather data indicative of a spatial orientation of a person with respect to the display. The tracking apparatus 522 includes a tracking apparatus operable to gather data indicative of a spatial orientation of a part of the body of a person with respect to the display.

In another alternative embodiment, the individualization module may include at least one additional embodiment. The at least one additional embodiment may include individualization module 532, and/or individualization module 534. The individualization module 532 includes an individualization module operable to individualize a display screen real estate size of the content presentation in response to the data indicative of a spatial aspect of a person with respect to the display 550. The individualization module 534 includes an individualization module operable to individualize a display screen real estate location of the content presentation in response to the data indicative of a spatial aspect of a person with respect to the display.

In a further embodiment, the system 500 may include the display 550. The display is operable to present a humanly perceivable content to at least one person proximate to the display. The display may include at least one additional embodiment. The at least one additional embodiment may include a display 552, and/or a display 554. The display 552 includes a display operable to present a humanly perceivable visual, audible, and/or scent content to at least one person proximate to the display. The display 554 includes a display apparatus operable to present a humanly perceivable content to at least one person proximate to the display device, the display apparatus including a single display surface or two or more display surfaces operable in combination to display the humanly perceivable content.

Figure 14:
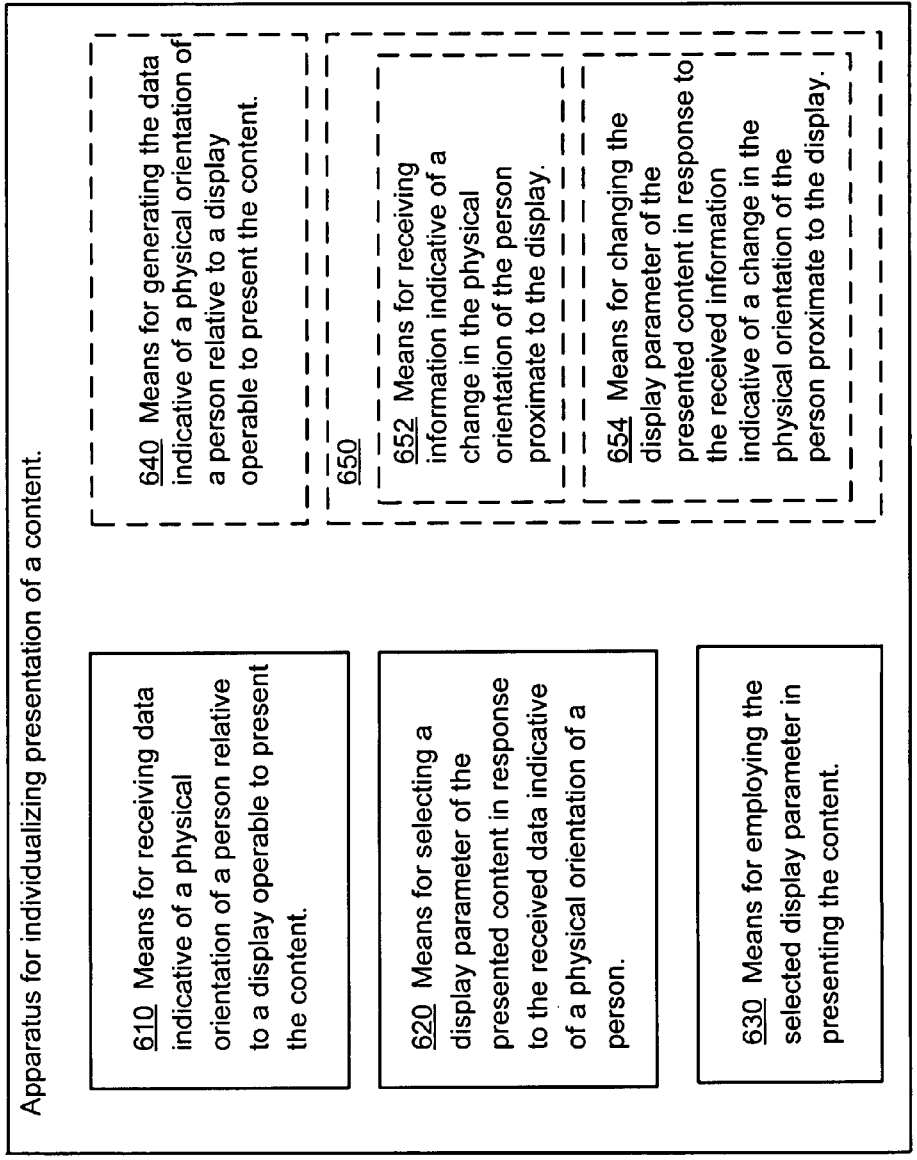
FIG. 14 illustrates an example apparatus for individualizing presentation of a content.

FIG. 14 illustrates an example apparatus 600 for individualizing presentation of a content. The apparatus includes means 610 for receiving data indicative of a physical orientation of a person relative to a display operable to present the content. The apparatus also includes means 620 for selecting a display parameter of the presented content in response to the received data indicative of a physical orientation of a person. The apparatus further includes means 630 for employing the selected display parameter in presenting the content.

In an alternative embodiment, the apparatus includes means 640 for generating the data indicative of a physical orientation of a person relative to a display operable to present the content. In another alternative embodiment, the apparatus 600 includes additional means 650. The additional means includes means 652 for receiving information indicative of a change in the physical orientation of the person proximate to the display. The additional means also include means 654 for changing the display parameter of the presented content in response to the received information indicative of a change in the physical orientation of the person proximate to the display.

Figure 15:
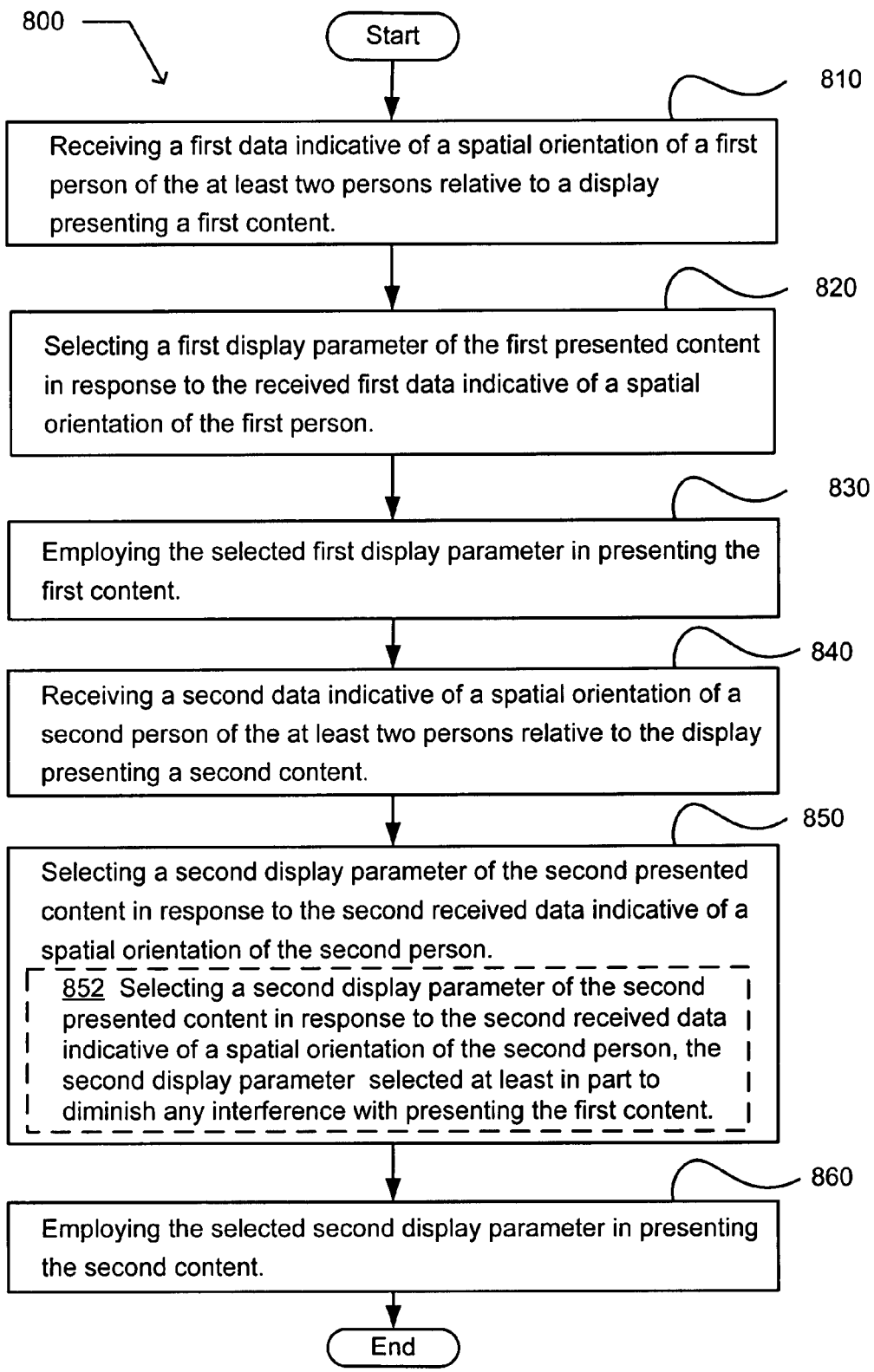
FIG. 15 illustrates an example operational flow of respectively individualizing content presentation for at least two persons.

FIG. 15 illustrates an example operational flow 800 of respectively individualizing content presentation for at least two persons. After a start operation, the operational flow moves to a first acquisition operation 810. The first acquisition operation receives a first data indicative of a spatial orientation of a first person of the at least two persons relative to a display presenting a first content. A first choosing operation 820 selects a first display parameter of the first presented content in response to the received first data indicative of a spatial orientation of the first person. A first utilization operation 830 employs the selected first display parameter in presenting the first content. A second acquisition operation 840 receives a second data indicative of a spatial orientation of a second person of the at least two persons relative to the display presenting a second content. A second choosing operation 850 selects a second display parameter of the second presented content in response to the second received data indicative of a spatial orientation of the second person. A second utilization operation 860 employs the selected second display parameter in presenting the second content. The operational flow then proceeds to an end operation.

In an alternative embodiment, the second choosing operation 850 may include at least one additional operation, such as the operation 852. The operation 852 selects a second display parameter of the second presented content in response to the second received data indicative of a spatial orientation of the second person. The second display parameter is selected at least in part to diminish any interference with presenting the first content.

Figure 16:
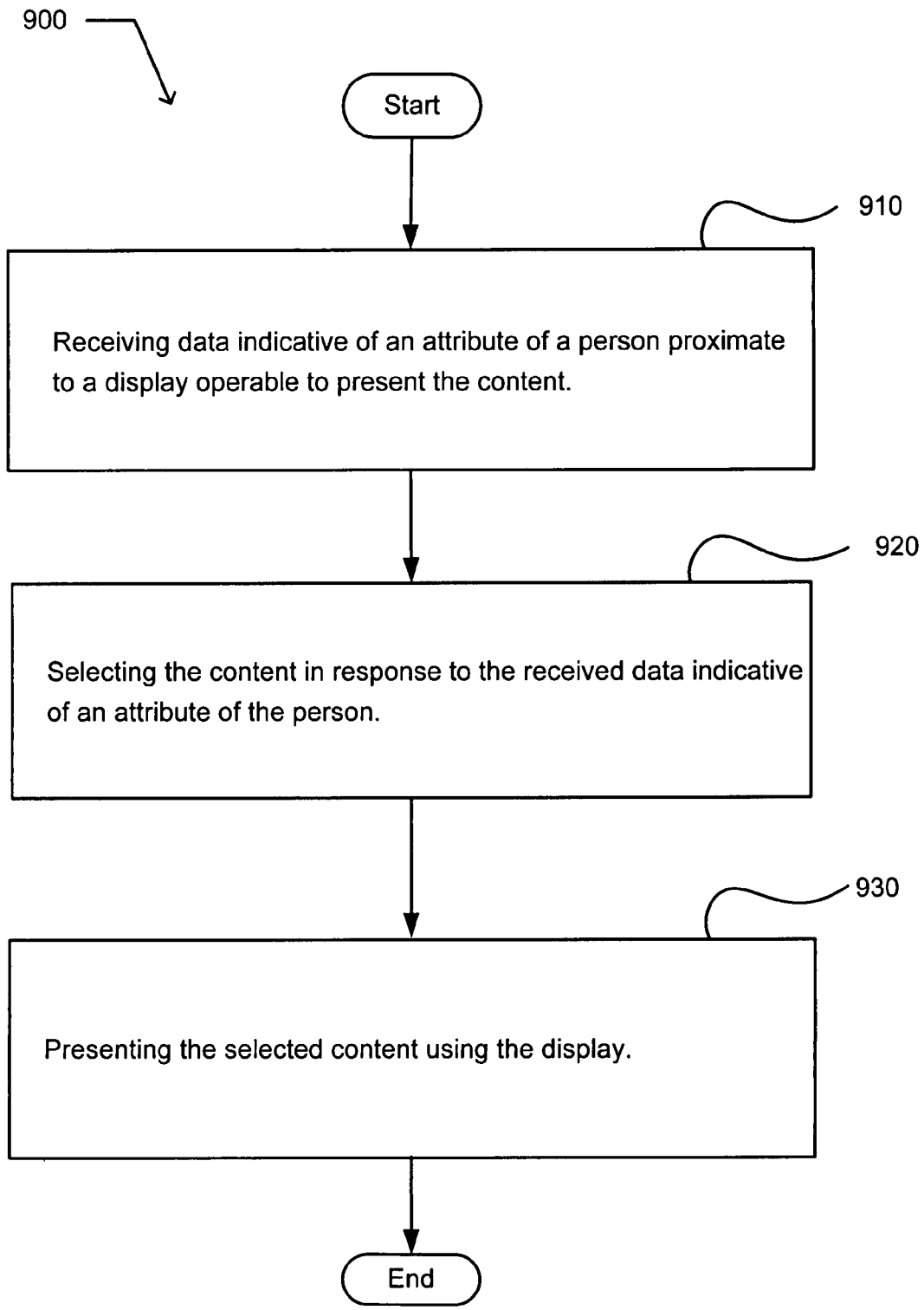
FIG. 16 illustrates an example operational flow individualizing a presentation of a content.

FIG. 16 illustrates an example operational flow 900 individualizing a presentation of a content. After a start operation, the operational flow moves to an acquisition operation 910. The acquisition operation receives data indicative of an attribute of a person proximate to a display operable to present the content. In an embodiment, the attribute of a person includes the person's age, sex, weight, product held by person, and/or product worn by person. A choosing operation 920 selects the content in response to the received data indicative of an attribute of the person. A utilization operation 930 presents the selected content using the display. The operational flow then moves to an end operation.

The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of individualizing a presentation of a content, the method comprising:
   receiving data indicative of one or more spatial aspects of a person relative to a display operable to present content, the one or more spatial aspects includes at least a facial expression of the person; and
   changing the content intensity based at least on the facial expression of the person, the content including at least a scent.

2. The method of claim 1, wherein receiving data indicative of one or more spatial aspects of a person relative to a display operable to present content includes:

receiving data indicative of at least one of a dynamic and/or a static physical orientation of a person relative to a display operable to present the content.

3. The method of claim 1, wherein receiving data indicative of one or more spatial aspects of a person relative to a display operable to present content includes:
receiving data indicative of a gaze orientation of a person relative to a display operable to present the content.

4. The method of claim 1, wherein receiving data indicative of one or more spatial aspects of a person relative to a display operable to present content includes:
receiving data indicative of at least one of a physical appearance or a physical expression of a person relative to a display operable to present the content.

5. The method of claim 1, wherein receiving data indicative of one or more spatial aspects of a person relative to a display operable to present content includes:
receiving gaze tracking data indicative of a gaze orientation of a person relative to a display operable to present the content.

6. The method of claim 1, wherein receiving data indicative of one or more spatial aspects of a person relative to a display operable to present content includes:
receiving coordinate information indicative of at least one of a person's head position or orientation relative to a display operable to present the content.

7. The method of claim 1, wherein receiving data indicative of one or more spatial aspects of a person relative to a display operable to present content includes:
receiving data indicative of one or more spatial aspects of a person relative to a display screen operable to present the content.

8. The method of claim 1, wherein receiving data indicative of one or more spatial aspects of a person relative to a display operable to present content includes:
receiving data indicative of one or more spatial aspects of a person relative to a display space usable to present the content.

9. The method of claim 1, wherein receiving data indicative of one or more spatial aspects of a person relative to a display operable to present content includes:
receiving data indicative of one or more spatial aspects of a person relative to a display that is presenting the content.

10. The method of claim 1, wherein receiving data indicative of one or more spatial aspects of a person relative to a display operable to present content includes:
receiving data indicative of one or more spatial aspects of a person relative to a display operable to at least one of displaying, exhibiting, or showing content.

11. The method of claim 1, wherein receiving data indicative of one or more spatial aspects of a person relative to a display operable to present content includes:
receiving data indicative of one or more spatial aspects of a person relative to a display operable to present at least one of a streaming or static content.

12. The method of claim 1, wherein receiving data indicative of one or more spatial aspects of a person relative to a display operable to present content includes:
receiving data indicative of one or more spatial aspects of a person relative to a display operable to present at least one of a visual, holographic, audible, or airborne-particle content.

13. The method of claim 1, wherein receiving data indicative of one or more spatial aspects of a person relative to a display operable to present content includes:
receiving data indicative of one or more spatial aspects of a person relative to a display having a visual screen area greater than three square feet and operable to present the content.

14. The method of claim 1, wherein receiving data indicative of one or more spatial aspects of a person relative to a display operable to present content includes:
receiving data indicative of one or more spatial aspects of a person relative to a display having a visual screen area greater than six square feet and operable to present the content.

15. The method of claim 1, wherein receiving data indicative of one or more spatial aspects of a person relative to a display operable to present content includes:
receiving data indicative of one or more spatial aspects of a person relative to a display having a visual screen area greater than twelve square feet and operable to present the content.

16. The method of claim 1, further comprising:
selecting an adjustment of a display parameter of the presented content in response to the received data indicative of one or more spatial aspects of the person.

17. A method of individualizing a presentation of a content, the method comprising:
receiving data indicative of one or more spatial aspects of a person relative to a display operable to present content, the one or more spatial aspects includes at least a facial expression of the person;
selecting a parameter intensity of the presented content in response to the received data indicative of one or more spatial aspects of the person; and
changing the content intensity based at least on the facial expression of the person, the content including at least a scent.

18. The method of claim 1, further comprising:
generating the data indicative of one or more spatial aspects of the person relative to a display operable to present the content.

19. The method of claim 18, wherein the generating data indicative of one or more spatial aspects of the person relative to a display operable to present the content further includes:
generating data indicative of at least one of a static physical orientation or a dynamic physical orientation of a person relative to a display operable to present the content.

20. The method of claim 1, further comprising:
receiving information indicative of a change in at least one of the one or more spatial aspects of the person proximate to the display; and
changing the display parameter of the presented content in response to the received information indicative of a change in the at least one of the one or more spatial aspects of the person proximate to the display.

21. The method of claim 1, further comprising:
selecting the display parameter of the presented content in response to the received data indicative of one or more spatial aspects of the person, wherein the display parameter includes a scent, the scent is perceivable to at least one person proximate to the display.

22. The method of claim 1, further comprising:
gathering data indicative of at least one of an attribute of the person with respect to the display, the attribute includes at least a spatial aspect of the person.

23. The method of claim 1, wherein the changing the content intensity based at least on the facial expression of the person, the content including at least a scent includes the facial expression of the person being at least a smile causing the content intensity to increase.

24. The method of claim 1, wherein the changing the content intensity based at least on the facial expression of the person, the content including at least a scent includes the facial expression of the person being at least a frown causing the content intensity to decrease.

25. The method of claim 1 further includes the content including at least sound volume.

26. The method of claim 1 further includes the content including at least visual effects.

27. The method of claim 1, wherein the changing the content intensity based at least on the facial expression of the person, the content including at least a scent includes changing one or more scent levels of at least one scent.

* * * * *